United States Patent
Tzeng et al.

(10) Patent No.: US 7,684,188 B2
(45) Date of Patent: Mar. 23, 2010

(54) MEDIA BASE SECURITY DEVICE AND METHOD OF USE

(75) Inventors: Chun-Kai Tzeng, Keelung (TW); Chun Yang Tseng, Taipei (TW)

(73) Assignee: Dell Products, LP, Round Rock, TX (US)

( * ) Notice: Subject to any disclaimer, the term of this patent is extended or adjusted under 35 U.S.C. 154(b) by 417 days.

(21) Appl. No.: 11/684,733

(22) Filed: Mar. 12, 2007

(65) Prior Publication Data

US 2008/0223089 A1   Sep. 18, 2008

(51) Int. Cl.
*G06F 1/16* (2006.01)
*H05K 5/00* (2006.01)
*H05K 7/00* (2006.01)

(52) U.S. Cl. .............................. 361/679.57; 361/679.41

(58) Field of Classification Search ............ 361/679.41, 361/679.42, 679.43, 679.44, 679.57
See application file for complete search history.

(56) References Cited

U.S. PATENT DOCUMENTS

| | | | | |
|---|---|---|---|---|
| 5,790,375 A * | 8/1998 | Lee | ........................ | 361/679.43 |
| 6,275,378 B1 * | 8/2001 | Lee et al. | ................ | 361/679.55 |
| 6,331,934 B1 * | 12/2001 | Helot et al. | ............. | 361/679.41 |
| 6,501,646 B2 * | 12/2002 | Suzuki | .................... | 361/679.41 |
| 6,522,533 B1 * | 2/2003 | Ikeuchi et al. | .......... | 361/679.43 |
| 6,744,627 B2 * | 6/2004 | Won et al. | ............... | 361/679.57 |
| 6,934,151 B2 * | 8/2005 | Nakano et al. | ......... | 361/679.43 |
| 7,038,908 B2 * | 5/2006 | Usui et al. | .............. | 361/679.41 |
| 7,283,357 B2 * | 10/2007 | Kim | ....................... | 361/679.41 |
| 7,505,265 B2 * | 3/2009 | Nishiyama | ............. | 361/679.41 |
| 2001/0009502 A1 * | 7/2001 | Ohnishi | ....................... | 361/686 |
| 2003/0128506 A1 * | 7/2003 | Won et al. | .................... | 361/686 |
| 2004/0145864 A1 * | 7/2004 | Usui et al. | .................... | 361/683 |
| 2005/0128687 A1 * | 6/2005 | Liang et al. | ................. | 361/679 |
| 2007/0177347 A1 * | 8/2007 | Nishiyama | .................. | 361/686 |
| 2007/0297130 A1 * | 12/2007 | Fan et al. | ..................... | 361/686 |

* cited by examiner

*Primary Examiner*—Jayprakash N Gandhi
*Assistant Examiner*—Adrian S Wilson
(74) *Attorney, Agent, or Firm*—Larson Newman & Abel, LLP

(57) ABSTRACT

A media base security device and method of use is disclosed. According to one aspect, a media base security device can include a lock rod mechanism coupled to a portion of a media base housing including a security lock aperture operable to receive a security lock. The media base security device can also include a release lever accessible external to the housing. The release lever can be operable to release the media base housing when coupled to a portable computer system. The release lever can include a lock rod seat operable to engage a lock rod extending from the lock rod mechanism in response to locking the security lock.

18 Claims, 3 Drawing Sheets

MEDIA BASE SECURITY DEVICE AND METHOD OF USE

FIELD OF THE DISCLOSURE

This disclosure relates generally to information handling systems, and more to a media base security mechanism and method of use.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Various types of security measures can be taken to ensure the safety of laptop computers and other portable computer systems. For example, various mechanical linkage systems can be used to enable and disable computer systems to ensure they are not stolen or accessed without consent of the owner. In some instances, portable systems can be docked and undocked to access additional resources when needed. However, when configuring portable systems with security devices, various mechanical linkages can impede on space availability internal to housings of portable systems. As such, use of some locking mechanisms can require oversized hardware components to deter theft or other undesired access.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
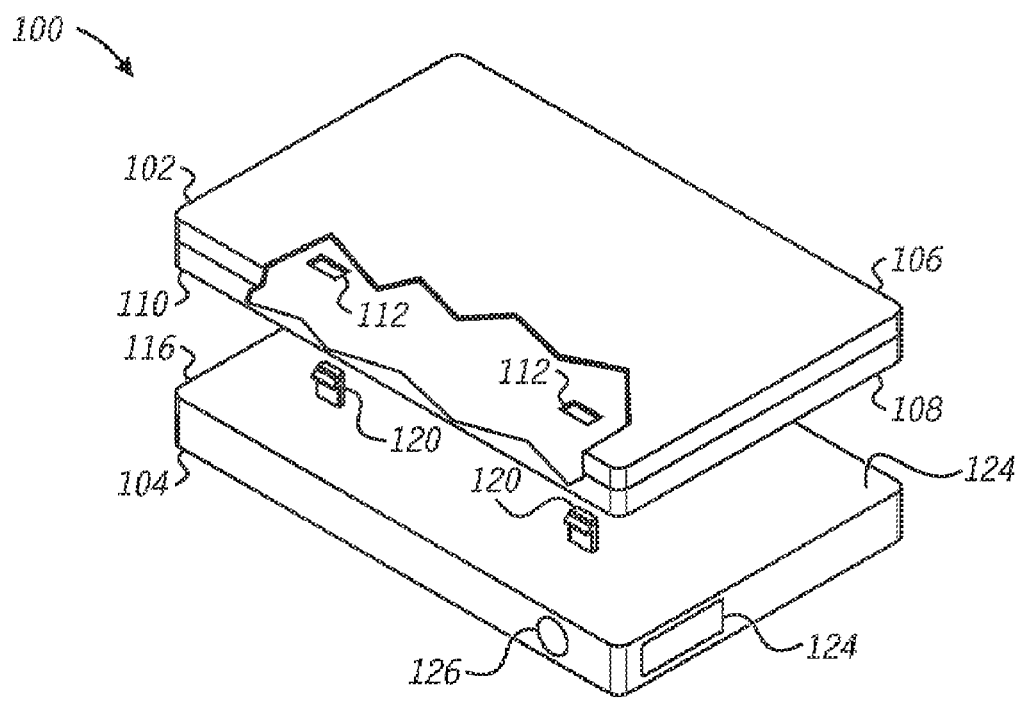
FIG. 1 illustrates a block diagram of an information handling system according to one aspect of the disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

According to one aspect of the disclosure, a media base security device can include a lock rod mechanism coupled to a portion of a media base housing including a security lock aperture operable to receive a security lock. The media base security device can also include a release lever accessible external to the housing. The release lever can be operable to release the media base housing when coupled to a portable computer system. The release lever can include a lock rod seat operable to engage a lock rod extending from the lock rod mechanism in response to locking the security lock.

According to another aspect of the disclosure, a method of operating a media base security device is disclosed. The method can include installing a security lock within a security lock aperture of a media base housing, and actuating the security lock. In one form, the actuating can cause the security lock to provide a first state to displace an actuator of the security lock towards a lock rod mechanism and contact a portion of a lock rod mechanism using a portion of the security lock. The actuating can further cause the security lock to extend a lock rod of the lock rod mechanism a distance away from the security lock, and inhibit rotation of a release lever to undock a portable computer system.

According to a further aspect of the disclosure, an information handling system is disclosed. The information handling system can include a media base including resources operable to be accessed by a portable computer system when docked. The media base can include a media base housing having a lock rod mechanism coupled to an internal portion of the media base housing. In one form, the lock rod mechanism can be located proximal to a security lock aperture that can receive a security lock. The media base can also include a release lever accessible along an external portion of the media base housing. In one form, the release lever can be operable to release the media base housing from the portable computer system. The release lever can further include a lock rod seat operable to engage a lock rod extending from the lock rod mechanism in response to actuating the security lock.

FIG. 1 illustrates a block diagram of an information handling system according to one aspect of the disclosure. The information handling system, illustrated generally at 100, can include a portable computer system 102 operable to be coupled to a media base 104 to access resources. In one form, the portable computer system 102 includes an ultralight notebook system, such as a Dell Inspiron Series ultralight notebook system. The portable computer system 102 is illustrated in a closed position and includes a top portion 106 and a bottom portion 108. The bottom portion 108 further includes a bottom surface 110 including a docking interface 112 operable to securely fasten the portable computer system 102 to the media base 104.

In accordance with one aspect, the media base 104 can include a media base housing 116 having a top surface 118 and one or more mounting couplers 120 operable to be coupled to the docking interface 112 of the portable computer system 102. The media base 104 can further include a release lever 124 that can be operated to disengage the portable computer system 102 and the media base 104. The media base 104 can also include a security lock interface 126 that can be engaged by a security lock (not illustrated) such as a notebook locks or other computer system locks such a Kensington lock having model number KMW64068E, a Targus lock having model number PA450U, PA410U, or any other notebook or media base lock that can be used as desired.

During operation, the portable computer system 102 can be placed on the media base 104 to access additional resources. For example, the media base 104 can enable access to one or more USB ports such as a USB 2.0 compliant communication port, a media bay that can provide access to Read/Write (R/W) optical drives, Digital Video Disk (DVD) drives, floppy disk drives (FDDs), hard disk drives (HDDs), and other media devices. The media base 104 can further provide access to a general purpose input output (GPIO) interface, serial communication ports, and parallel communication ports. A user can lock the media base 104 and the portable computer system 102 by inserting a security lock into the security lock interface 126. A user can actuate the security lock thereby causing the media base 104 to be securely coupled to the portable computer system 102. In one form, the security lock can actuate a locking mechanism of the media base operable to secure the media base 104 and the portable computer system 102, and restrict movement of the release lever 124. In this manner, the media base 104 and the portable computer system 102 can be maintained in a secure operating environment.

Figure 2:
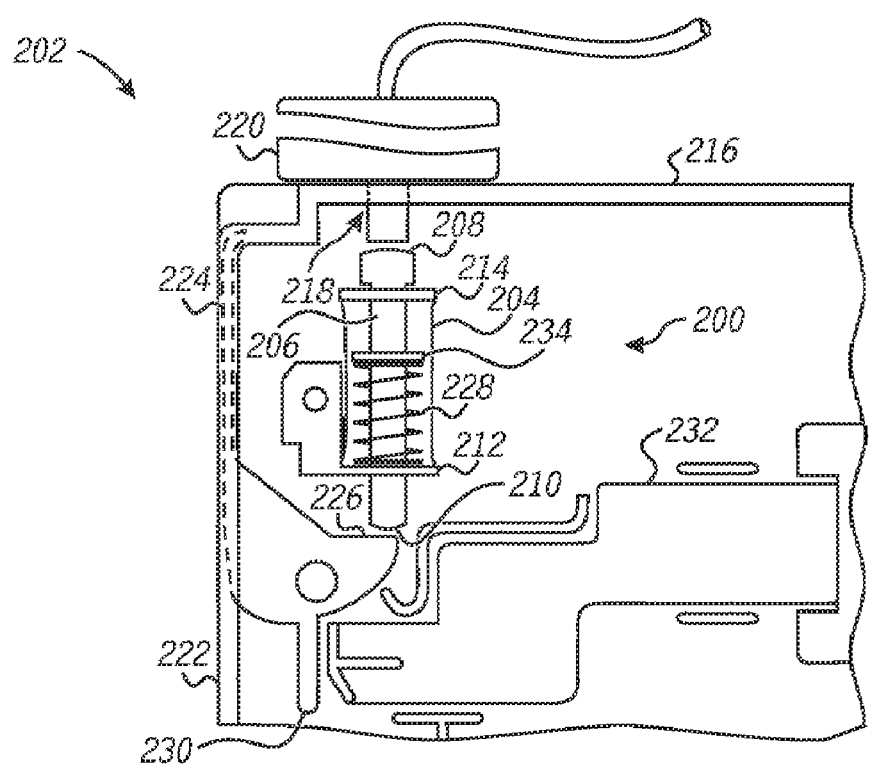
FIG. 2 illustrates a top perspective view of a media base security device in accordance with one aspect of the disclosure.

FIG. 2 illustrates a top perspective view of a media base security device in accordance with one aspect of the disclosure. The media base security device, illustrated generally at 200, can be provided in association with a media base 202, or various other systems that can employ the media base security device 200. The media base security device 200 includes a lock rod mechanism 204 including a lock rod 206 having a first end 208 and a second end 210 distal from the first end 208. The lock rod mechanism 204 further includes a first flange 212 proximally located to the first end 208, and a second flange 214 proximally located to the second end 210.

In one form, the media base 202 can also include a first side portion 216 including a security lock aperture 218 that can be coupled to a security lock 220. The media base 202 also includes a second side portion 222 and a release lever 224 operable to release a portable computer system (not illustrated) when coupled to the media base 202. The release lever 224 further includes a lock rod seat 226 operable to engage the second end 210 portion 208 of the lock rod 206. The lock rod mechanism 204 further includes a spring actuator 228 displaced around the lock rod 206 and between the first flange 212 and the second flange 214. According to a further aspect, the lock rod mechanism 204 can include a third flange 234 operably coupled to the spring actuator 228.

During use, a user can insert the security lock 220 into the security lock aperture 218. When actuated (as illustrated), the security lock 220 can interface the first end 206 of the lock rod 206 and maintain a force on the lock rod 206 away from the first side portion 216. In this manner, rotation of the release lever 224 away from the second side portion 222 can be inhibited thereby limiting engagement of the slide bar seat 230 to the slide bar 232. As such, the media base 202 can be secured to a portable computer system.

Figure 3:
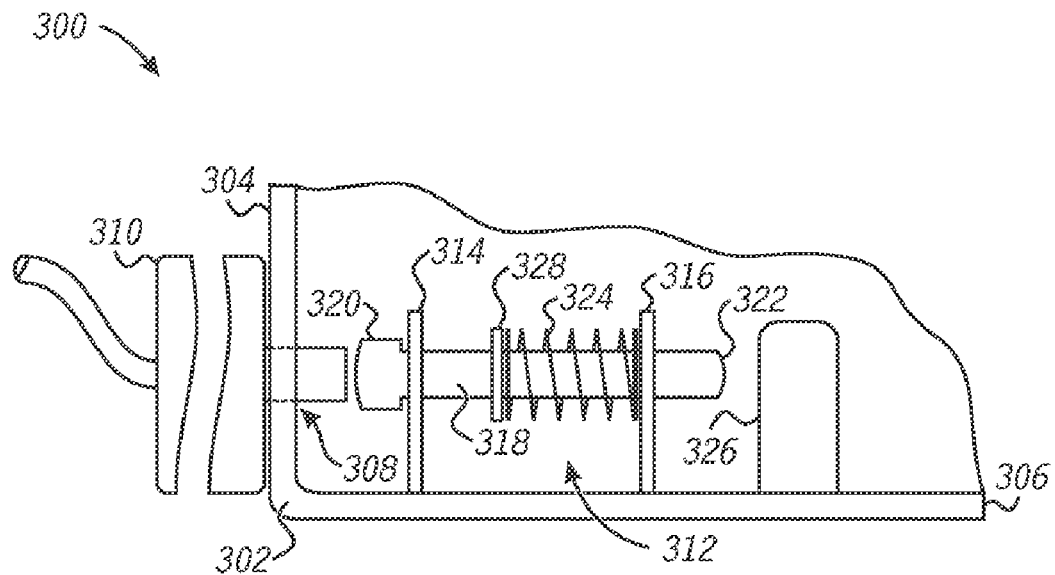
FIG. 3 illustrates a side perspective view of a media base security device in accordance with one aspect of the disclosure.

FIG. 3 illustrates a side perspective view of a media base security device in accordance with one aspect of the disclosure. The media base security device, illustrated generally at 300, can be coupled to a media base housing 302 including a side portion 304 and a bottom portion 306. The side portion 304 can include a security lock aperture 308 operable to receive a security lock 310. The media base security device 300 further includes a lock rod mechanism 312 includes a housing having a first flange 314 located proximal to the security lock aperture 308. The lock rod mechanism 312 further includes a second flange 316 located distal from the first flange 314. The first flange 314 and the second flange 316 support a lock rod 318 including a first end 320 and a second end 322. The lock rod mechanism 312 can further include a spring actuator 324 displaced around the lock rod 318. The media base housing 302 further includes a lock rod seat 326 operable to engage the second end 322 of the lock rod 318. The lock rod seat 326 can be provided in association with a release lever (not illustrated) that can be operated to detach a portable computer system and a media base of the media base housing 302.

During operation, a user can insert the security lock 310 into the security lock aperture 308. The security lock 310 can be actuated to contact the first end 320 of the lock rod 318. Upon actuating the security lock 310 (e.g. rotating to a locked position), the lock rod 318 can be extended toward the lock rod seat 326. In one form, the lock rod 318 need not contact the lock rod seat 326 but can restrict movement of the lock rod seat 326 when a release lever may be rotated. In this manner, the lock rod seat 326 can restrict movement of a release lever thereby maintaining a coupling or docking of a portable computer system and the media base. According to one aspect, a third flange 328 can be provided to couple the spring actuator 324.

According to a further aspect, as a user removes the security lock 310 from the security lock aperture 308 (e.g. unlocks the security lock), the spring actuator 324 retracts toward the side portion 304 and the lock rod 318 can be displaced toward the side portion 304 of the media base housing 302. In this manner, rotating the release lever and the lock rod seat 326 will not be inhibited by the lock rod 318, and the media base housing 302 and the portable computer system can be detached as desired.

Figure 4:
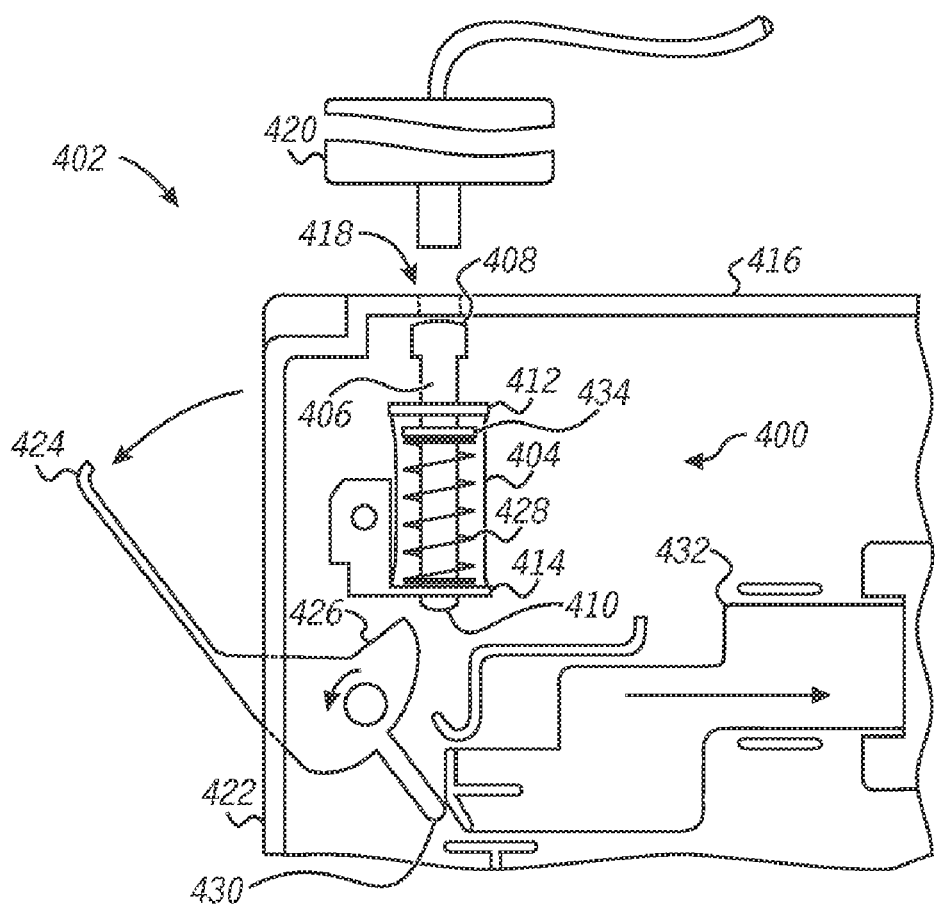
FIG. 4 illustrates a media base employing a media base security device according to another aspect of the disclosure.

FIG. 4 illustrates a media base employing a media base security device according to another aspect of the disclosure. A media base security device, illustrated generally at 400, can be provided in association with a media base 402 or various other systems that can employ the media base security device 400. The media base security device 400 includes a lock rod mechanism 404 including a lock rod 406 having a first end 408 and a second end 410 distal from the first end 408. The lock rod mechanism 404 further includes a housing having a first flange 412 proximally located to the first end 408, and a second flange 414 proximally located to the second end 410.

In one form, the media base 402 can also include a first side portion 416 including a security lock aperture 418 that can be coupled to a security lock 420. The media base 402 also includes a second side portion 422 and a release lever 424 that can be rotated away from the second side portion 422 (as illustrated) to release a portable computer system (not illustrated) when coupled to the media base 402. The release lever 424 further includes a lock rod seat 426 operable to engage the second end 410 of the lock rod 406 when the lock rod 406 is extended by the security lock 420. The lock rod mechanism 404 further includes a spring actuator 428 displaced around the lock rod 406 and between the first flange 412 and the second flange 414. According to one aspect, a third flange 434 can be operably coupled to the spring actuator 428.

As illustrated, the security lock 420 is unlocked or removed, and the spring actuator 428 extends the lock rod 406 towards the security lock aperture 418 giving sufficient clearance to the lock rod seat 426 when rotated. As such, when the release lever 424 rotates away from the second side portion 422, the slide bar seat 430 can contact the slide bar 432 operable to disengage the docking interface of the media base 402 and the portable computer system.

Figure 5:
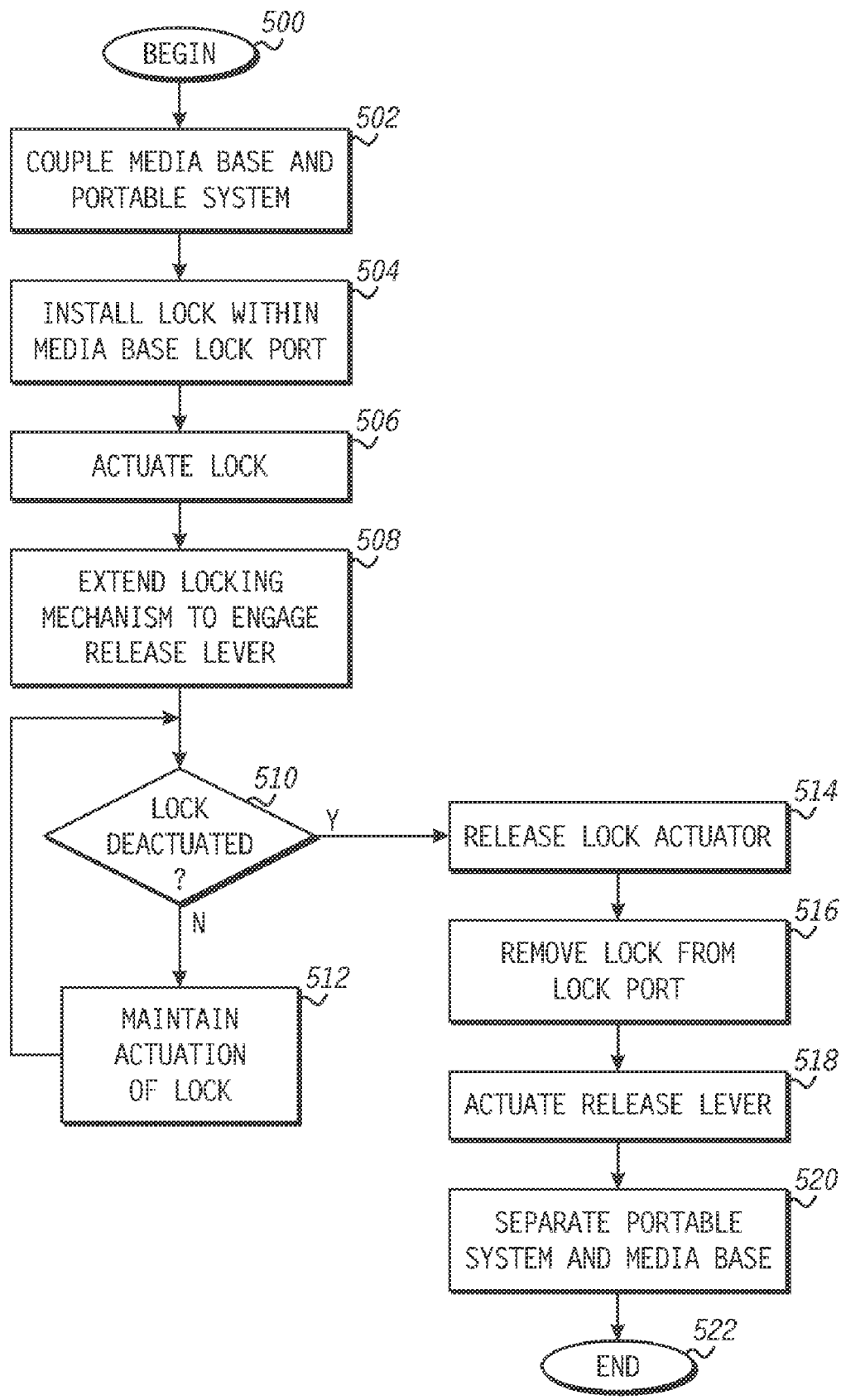
FIG. 5 illustrates a flow diagram of a method of securing a media base according to one aspect of the disclosure.

FIG. 5 illustrates a flow diagram of a method of securing a media base according to one aspect of the disclosure. The method begins generally at block 500. At block 502, a user can couple a media base and portable computer system. For example, the user can couple a media base to an ultralight notebook to access resources of the media base. A user can actuate a release lever in association with coupling the media base and the portable system. Upon coupling the media base and the portable computer system, the method proceeds to block 502 and a security lock can be installed within a media base lock interface or security lock aperture at 504. The method can then proceed to block 506 and the user can actuate the lock using a key or other form of actuation of the installed lock. The method can then proceed to block 508 and a locking mechanism associated with the security lock can be extended to engage a portion of a release lever. In this manner, rotation of the release lever can be inhibited thereby maintaining the media base and the portable computer system in a coupled position. According to one aspect, a locking mechanism can include a small footprint spring-loaded media base security device. For example, the locking mechanism can include a spring-loaded lock rod that can be extended to engage a portion of the release lever to prohibit the release lever from being rotated to release the media base and the portable computer system.

Upon activating the lock, the method can proceed to decision block 510, and if the lock is not deactivated (e.g. unlocked, removed), the method proceeds to block 512 and the locking mechanism maintains inhibiting rotation of the release lever. If at decision block 510, the lock has been deactivated, the method can proceed to block 514 and the lock actuator can be released. In one form, releasing the lock actuator can include operating a locking mechanism that retracts a lock pin that may be inhibiting rotation of a release lever. The method can then proceed to block 516 and a user can remove the security lock from the security lock port or aperture. A user can then actuate a release lever at block 518, and the portable computer system and the media base can be separated at block 520. The method then proceeds to block 522 and ends.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A media base security device comprising:
a lock rod mechanism coupled to a portion of a media base housing including a security lock aperture operable to receive a security lock, the lock rod mechanism including:
a lock rod housing coupled to the media base housing, the lock rod housing including:
a first flange coupled to a first end of the lock rod at a location proximal to the security lock aperture, the first flange including a first opening sized to receive the lock rod; and
a second flange displaced at a distance from the first flange and approximately aligned with the first flange, the second flange allowing the lock rod to extend through the second flange and proximal to the lock rod seat; and
a spring actuator displaced around the lock rod and between the first flange and the second flange; and
a release lever accessible external to the housing, the release lever operable to release the media base housing when coupled to a portable computer system, the release lever further including a lock rod seat operable to engage a lock rod extending from the lock rod mechanism in response to locking the security lock.

2. The media base security device of claim 1, further comprising:
a slide bar operable to be engaged by the release lever, the slide bar operably coupled to a docking mechanism of the media base; and
a slide bar seat coupled to the release lever and operable to engage the slide bar upon activation of the release lever when the security lock is unlocked.

3. The media base security device of claim 1, wherein the media base housing includes at least one media base resource stored within the media base housing and accessible by the portable computer system docked to the media base housing.

4. The media base security device of claim 3, further comprising the security lock located within the security lock cavity, the security lock operable to disable releasing the portable computer system from the media base housing.

5. The media base security device of claim 1, further comprising a spring displaced around a portion of the lock rod and operable to be compressed as the lock rod is displaced away from the security lock aperture.

6. The media base security device of claim 5, further comprising the spring operable to displace the lock rod toward the security lock aperture upon removing the security lock.

7. The media base security device of claim 5, further comprising:
- wherein the release lever includes a slide bar seat operable to engage a slide bar operably associated with a docking interface; and
- wherein the slide bar is operable to separate the media base housing docked and the portable computer system from one another when the security lock is unlocked.

8. The media base security device of claim 1, further comprising the lock rod mechanism operable to engage a portion of a locking mechanism operably associated with the security lock placed within the security lock aperture, the security lock operable to inhibit displacement of the lock rod.

9. A method of operating a media base security device, the method comprising:
- installing a security lock within a security lock aperture of a media base housing; and
- actuating the security lock, wherein the actuating causes the security lock to provide a first state to:
  - displace an actuator of the security lock towards a lock rod mechanism, the lock rod mechanism including:
    - a lock rod housing coupled to the media base housing, the lock rod housing including:
      - a first flange coupled to a first end of a lock rod at a location proximal to the security lock aperture, the first flange including a first opening sized to receive the lock rod; and
      - a second flange displaced at a distance from the first flange and approximately aligned with the first flange, the second flange allowing the lock rod to extend through the second flange and proximal to the lock rod seat; and
    - a spring actuator displaced around the lock rod and between the first flange and the second flange;
  - contact a portion of the lock rod mechanism using a portion of the security lock;
  - extend the lock rod of the lock rod mechanism a distance away from the security lock; and
  - inhibit rotation of a release lever to undock a portable computer system.

10. The method of claim 9, further comprising:
unlocking the security lock, wherein the unlocking causes a second state to:
- retract the lock rod by the distance; and
- enable the release lever to rotate sufficient to undock the media base housing and the portable computer system.

11. The method of claim 10, further comprising:
actuating the release lever;
displacing a slide bar along the media base housing; and
undocking the media base housing and the portable computer system in response to displacing the slide bar.

12. The method of claim 9, further comprising:
locking the security lock;
compressing a spring tension element of the lock rod mechanism in response to locking the security lock; and
displacing the lock rod away from the security lock aperture.

13. The method of claim 12, further comprising:
unlocking the security lock;
uncompressing the spring tension element; and
displacing the lock rod using the spring tension element.

14. The method of claim 13, further comprising:
rotating the release lever away from the media base housing; and
separating the media base housing and the portable computer system.

15. The method of claim 14, further comprising:
rotating the release lever toward the media base housing; and
maintaining the lock rod proximal to the security lock aperture using the spring tension element.

16. An information handling system comprising:
- a media base including resources operable to be accessed by a portable computer system when docked, the media base including a media base housing;
- a lock rod mechanism coupled to an internal portion of the media base housing, the lock rod mechanism located proximal to a security lock aperture operable to receive a security lock, the lock rod mechanism including:
  - a lock rod housing coupled to the media base housing, the lock rod housing including:
    - a first flange coupled to a first end of the lock rod at a location proximal to the security lock aperture, the first flange including a first opening sized to receive the lock rod; and
    - a second flange displaced at a distance from the first flange and approximately aligned with the first flange, the second flange allowing the lock rod to extend through the second flange and to the lock rod seat; and
  - a spring actuator displaced around the lock rod and between the first flange and the second flange; and
- a release lever accessible along an external portion of the media base housing, the release lever operable to release the media base housing from the portable computer system, the release lever further including a lock rod seat operable to engage a lock rod extending from the lock rod mechanism in response to actuating the security lock.

17. The information handling system of claim 16, further comprising a notebook security lock.

18. The information handling system of claim 16, further comprising a portable laptop computer system.

* * * * *